Patented May 18, 1926.

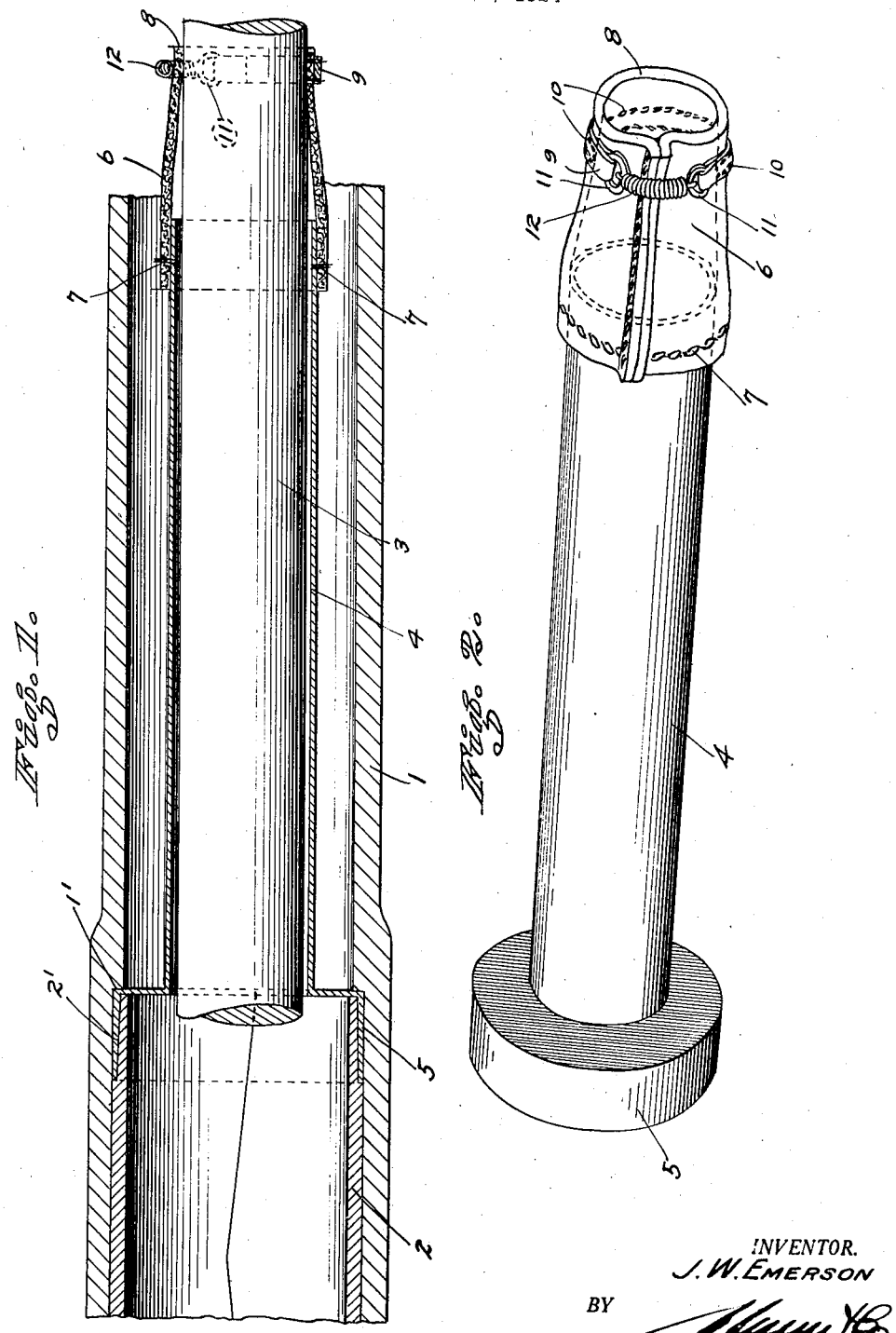

1,585,189

UNITED STATES PATENT OFFICE.

JOHN W. EMERSON, OF LEWISTON, IDAHO.

GREASE RETAINER FOR AUTOMOBILE REAR AXLES.

Application filed November 19, 1924. Serial No. 750,874.

This invention relates to lubricant retaining means adapted for use with the rear axle of a standard Ford automobile, or one of similar construction, and the objects of the invention are to provide an inexpensive device which may be easily applied and which will effectually prevent the lubricant from within the differential housing from running along the rear axle housing and finally dripping out of and over the rear wheels, or getting on the brake drums.

The invention is carried out by the construction shown in the accompanying drawings, and in which—

Figure 1 is an approximately full size longitudinal section of a portion of the rear axle housing and outer roller bearing shell for the wheel of a Ford automobile with my device in position within the axle housing and surrounding a broken length of the rear driving axle so as to show its relation thereto.

Figure 2 is a perspective view of my device apart from the automobile structure included in Figure 1.

In the drawings 1 represents the rear axle housing of a Ford automobile, 2 a portion of the outer split shell of the roller bearing for the wheel end of the axle, 3 shows a portion of the rear axle as it would be positioned in the housing, 4 a sheet metal tube being part of my invention and surrounding the axle and with an enlarged cup-like portion 5 at the outer end tightly surrounding the inner end of the roller bearing shell 2.

To provide room for the rim of this cup portion between the bearing shell and the housing 1, the shell is reduced slightly around its end preferably by grinding around the outside to form a short neck 2′ thereon preferably slightly tapered and the cup is fitted tightly thereover.

The tight fit aided by the expanding tendency of the split shell holds the cup tightly in place, yet it is easily applied to the shell and pushed into place within the housing with the tube 4 projecting over the shaft.

At the inner end of the tube 4 is a leather or other flexible collar or boot 6 secured to the end of the tube preferably by cementing or sewing through the tube as indicated at 7, or both, and the boot is reduced slightly at its inner end 8 to form an opening adapted to fit snugly over the rear axle and is resiliently held thereagainst by a strap 9 stitched at 10 to the boot and having a ring 11 in each free end connected by a small spiral spring 12.

The leather boot arrangement as described forms a tight but yielding joint sealing the inside of the tube from the axle housing space so that no oil can run along the housing from the differential (not shown) and into the wheel to leak therefrom, yet at the same time the joint being yielding and of leather which is always exposed to grease and oil forms a lubricated joint for the axle to revolve in while the tube remains fixed with the bearing shell which it embraces, and is prevented from longitudinal displacement by the cup portion abutting the shoulder 1′ of the housing where it is enlarged to receive the outer shell 2 for the roller bearing.

I claim:

A lubricant retainer of the character described for the rear axle of an automobile comprising a tube adapted to go over the axle within the axle housing, said tube being provided at one end with a cup shaped flange embracing the inner end of the roller bearing outer shell and provided at its other end with a flexible boot yieldingly embracing the axle, said boot being stitched at one end to the tube and provided with contracting means at the other end.

JOHN W. EMERSON.